United States Patent [19]
Barlett et al.

[11] Patent Number: 5,557,603
[45] Date of Patent: Sep. 17, 1996

[54] RADIO COMMUNICATIONS APPARATUS WITH DIVERSITY

[75] Inventors: Ian Barlett, Petersfield; Peter W. D. Bishop, Swindon, both of Great Britain

[73] Assignee: Motorola, Inc., Schaumburg, Ill.

[21] Appl. No.: 256,044

[22] PCT Filed: Nov. 16, 1992

[86] PCT No.: PCT/EP92/02630

§ 371 Date: Oct. 19, 1994

§ 102(e) Date: Oct. 19, 1994

[87] PCT Pub. No.: WO93/13605

PCT Pub. Date: Jul. 8, 1993

[30] Foreign Application Priority Data

Dec. 23, 1991 [GB] United Kingdom ............ 9127292

[51] Int. Cl.⁶ .......................................... H04B 7/08
[52] U.S. Cl. ............. 370/16; 375/267; 375/347; 455/8; 455/137; 455/278.1
[58] Field of Search ................... 370/13, 16, 17, 370/50, 95.1, 95.3; 375/267, 347; 455/8, 10, 50.1, 52.1–52.3, 65, 67.3, 137, 272, 275, 277.1, 277.2, 278.1

[56] References Cited

U.S. PATENT DOCUMENTS 5,097,484  3/1992  Akaiwa ................ 375/267

FOREIGN PATENT DOCUMENTS 4111847  4/1991  Germany.

OTHER PUBLICATIONS

ICC '82 Conference Record, vol. 1(3), Jun. 1982, NY, USA pp. 2B.5.1–2B.5.5., ASAI, et al., Design and Performance of a 200MB/s Synchronised Switchover Equipment.

Mototola Technical Developments, vol. 10, Mar. 1990, Schaumburg, Illinois, pp. 62–63, Tayloe, Space Deversity Hopper for Digital Data Transmission.

Primary Examiner—Melvin Marcelo
Attorney, Agent, or Firm—Anthony G. Sitko; Jeffrey G. Toler

[57] ABSTRACT

This invention relates to apparatus and a method for provision of diversity in reception in a communications system such as the GSM cellular radio system. A received call of low quality is received through a first of two antennas (15, 16) and through first of a plurality of receivers (10–14). A spare receiver that is not required for receipt of a call is identified and the spare receiver is switched to receive the call through the second antenna. The spare receiver is tuned to the frequency of the call of low quality and the calls are diversity combined through the first receiver and the spare receiver.

10 Claims, 3 Drawing Sheets

RADIO COMMUNICATIONS APPARATUS WITH DIVERSITY

SUMMARY OF THE INVENTION

This invention relates to apparatus and a method for provision of diversity in reception for a communications system such as the GSM cellular radio system.

SUMMARY OF THE PRIOR ART

It is a problem in radio systems such as the GSM cellular radio system operating at frequencies of the order 900 MHz that a signal propagates from a transmitting unit to a receiving unit over a number of paths and, at the receiving unit, it exhibits multi-path fading.

It is observed that if two or more receive antennas are provided, separated in distance, supplying signals to separate received channels, then the fading of the various channels is more or less independent, i.e. it is unlikely that all channels will fade together. Techniques known as diversity combining make use of several received signals to improve the realised signal to noise ratio and hence improve the bit error rate. For example a typical dual diversity (2 channel) system might offer an improvement in signal to noise ratio (SNR) of 10 dB.

Providing diversity is not without substantial cost. It is not possible merely to combine the main and diversity signals because they can interfere additively and destructively with equal probability. It is necessary to duplicate the receive circuitry including the receive amplifier and demodulator.

It would be desirable to provide diversity without the additional cost of duplicated circuitry.

SUMMARY OF THE INVENTION

According to the present invention there is provided radio communications apparatus for receiving a plurality of calls comprising: a plurality of receivers tunable to a plurality of frequencies, first and second antennas, switching means for switching the plurality of receivers to selected ones of the first and second antennas and control means coupled to the plurality of receivers for tuning the receivers to receive calls, the control means comprising: means for identifying a received call of low quality received through the first of the antennas and through a first of the plurality of receivers, means for identifying a spare receiver that is not required for receipt of a call, means for causing the switching means to switch the spare receiver to receive the call through the second antenna, means for tuning the spare receiver to the frequency of the call of low quality and means for diversity combining the calls through the first receiver and the spare receiver.

In this way, the control means utilize spare channel capacity to dynamically allocate receiver units to the diversity antenna and in this way there is provided a second source for the call identified as being of low quality.

The invention takes advantage of the realisation that, in a given cell of a cellular radio system, only a proportion of the calls passing through a base station are of such low quality as to substantially benefit from diversity combining. The invention also recognizes that at a given time the receive units are rarely at 100% capacity, so that there is often spare channel capacity which can be utilized for diversity purposes.

The invention provides the ability to add one or more extra receive units which can be dynamically shared for diversity purposes, rather than duplicating every receive unit.

In a time division multiplex system, a spare receive unit is identified for each time slot (it may be a different unit in each time slot). As a preferred feature of the invention, the control means spread the on-going calls in time among different time slots so that there is, as far as possible, spare channel capacity in each time slot. This spare channel capacity can then be used for diversity.

As a further feature of the invention, the receive antenna may be sectorized and the diversity antenna may be an adjacent sector of the receive antenna. This feature recognizes that the lobes of adjacent sectors of a sectorized antenna usually overlap to a degree, so that it is frequently the case that the signal from a mobile unit can be received at two radially separated sectors of a sectorized antenna. This feature avoids the necessity to have a second physically separated antenna, thereby further reducing cost.

The invention has the advantage of providing diversity by more fully utilizing existing equipment, merely by appropriate switching and appropriate software.

DETAILED DESCRIPTION OF THE PREFERRED EMBODIMENT

Figure 1:
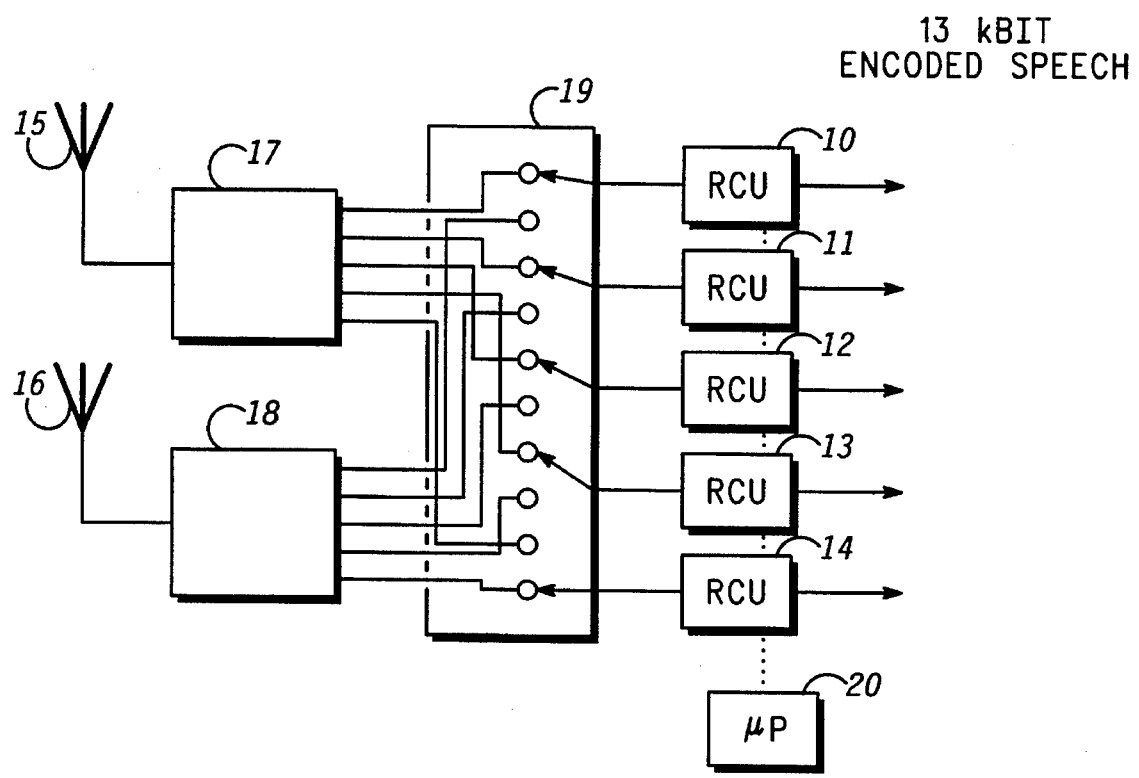
FIG. 1 is a block diagram of receive circuitry of a base station in accordance with the present invention.

Referring to FIG. 1, the circuitry comprises five receive channel units (RCUs) a numbered 10 to 14. The invention is equally applicable to any number of RCU's. Each of these units comprises amplifier circuitry, tuner circuitry and demodulator circuitry (not shown) and the output of each of these units is 13 Kbit encoded speech for passing to a vocoder. Each RCU is tunable to a selection of frequencies, which are the frequencies allocated to the cell served by the base station and are selected from the total set of frequencies for the cellular radio system.

Also shown in FIG. 1 are two antennas, a "main" antenna 15 and a "diversity" antenna 16. These are connected to splitters 17 and 18 respectively, each of which splits the received signal from its antenna into 5 separate signals. The splitters 17 and 18 are connected to the RCUs 10 to 14 through a switch matrix 19. The switch matrix 19 is arranged to connect any one or more of the RCUs 10 to 14 to either the splitter 17 or the splitter 18, on a per timeslot basis.

The RCUs 10 to 14 are under the control of a controller 20 in the form of a microprocessor. The RCUs in turn control the switch matrix 19 by using the coaxial cables from the switch matrix 19 to pass 1200 baud data back to the switch matrix 19 multiplexed with the r.f. signals passing in the other direction. As an alternative to receiving control data from the RCUs, control can come directly from the controller 20 over a local area network to which the switch matrix 19 can be connected.

The controller 20 controls the setting up of channels and the allocation of time slots to receive (and transmit) calls.

Figure 2:
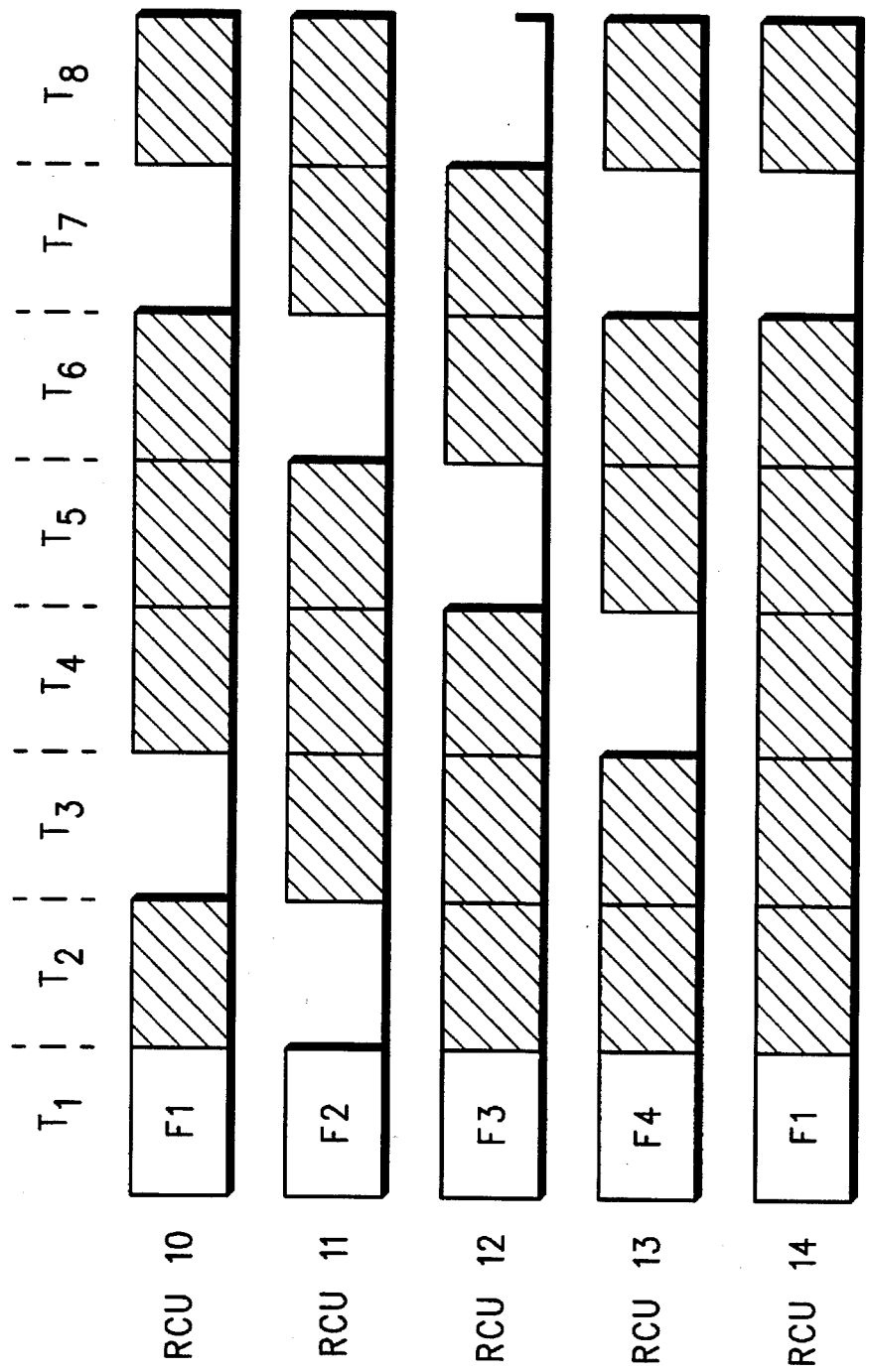
FIG. 2 is a representation of calls passing through receive channel units (RCUs) of FIG. 1 on different time slots.

The manner in which the controller 20 controls the allocation of frequencies and time slots to set up calls is illustrated in FIG. 2. In this figure, eight time slots are shown in a TDMA arrangement and five receive channel units are illustrated. A "channel" is a RCU tuned to a particular frequency on a particular time slot. A single frequency can yield 8 channels and a base station having five RCUs can pass 40 channels. As shown in FIG. 2, on the first time slot shown (T1) RCU 10 is tuned to frequency F1, RCU 11, 12 and 13 are tuned to frequencies F2, F3 and F4 respectively and, in this example and in accordance with the invention at least in its preferred embodiment, RCU 14 is tuned to frequency F1. In this manner, RCU 14 is being used as a diversity receive channel unit in parallel with RCU 10.

Referring again to FIG. 1, RCU 10 controls the switch matrix 19 to connect RCU 10 to splitter 17 and RCU 14 controls the matrix to connect RCU 14 to splitter 18, so that these RCUs receive signals from the main antenna 15 and the diversity antenna 16 respectively. The same call is being processed separately through two separate RCUs and the resultant data stream can be diversity combined using selection diversity, maximum ratio diversity or equal gain diversity.

As an example of selection diversity the 13 Kbit encoded speech is passed to an equalizer and an error corrector (not shown), and the error corrector provides an indication of bit error rate. A selection is made between the two bit streams so as to select the bit stream having the lower bit error rate. Other arrangements can be provided to give maximum ratio diversity or equal gain diversity.

The manner in which the controller 20 selects a particular RCU for connection to the diversity antenna is as follows. Each RCU 10 to 14 provides two measurements of signal quality designated as Rxlev and Rxqual, which represent the received signal strength indication (RSSI) and the bit error rate (BER). In a given time slot the controller 20 measures these two indications for each call passing through the RCU. It determines whether one or both of these indicators falls below a respective threshold. Where this is the case for a given call, the controller 20 determines whether there is a spare RCU for which there is no call being received on that time slot and, where a spare RCU is available, it causes that RCU to be tuned to the same frequency as the low quality signal and applies diversity to that particular call.

In a given cell, only a small proportion of units, especially those on the boundary of the cell, will, on average, experience poor signal quality. Using the Rxlev and Rxqual indicators, it is possible to identify a signal that is subject to multi-path fading and, by providing diversity, the additional antenna can enhance the signal and in particular can smooth out troughs in the signal.

The controller 20 maintains a matrix, as shown in FIG. 2, correlating calls (i.e. frequencies assigned to individual mobiles) on each time slot. It is a preferred feature of the invention that the controller 20 manages the allocation of time slots as far as possible to maintain a spare RCU in each time slot. This is illustrated in FIG. 2 where each of the time slots T1 to T8 has only 4 out of a possible 5 calls. Clearly this is not possible when the cell is fully loaded (i.e. with 40 calls passing through at a given time). In setting up a new call, the controller 20 chooses, if possible, a time slot that is ⅗ loaded or less, so that the time slot will still not be fully loaded after allocation of the new call. This means that there is still spare channel capacity on that time slot for diversity purposes. In situation shown in FIG. 2, a new call could be set up on time slot T7 without fully loading that time slot. The system would still be managed such that each time slot has a spare RCU which is not passing any call, so that the spare RCU can be used for diversity. It is not necessarily the same RCU for each time slot.

Similarly, when a call terminates, a RCU on a time slot becomes free (unless there is another mobile queuing to make a call). In this situation, the controller 20 has the ability to move a call on to that time slot in order to make spare capacity available on a different time slot. This is achieved by an intra-cell handover in which the base station instructs the mobile to change its time slot with or without a change of frequency and simultaneously the base station and mobile change to the new time slot (and frequency if necessary).

Where there is more than one unit needing diversity on a given time slot, the control 20 can arrange for there to be more than one spare RCU available on that time slot. Conversely, the controller 20 can spread out the "problematic" calls so that they do not all occur in the same time slot, thereby spreading out the spare capacity to be allocated accordingly.

Diversity can be applied in this way as soon as a call commences, or during a call, when it begins to fade or when a spare RCU becomes available. Diversity may be stopped when the spare RCU is required to set up a new call.

The above arrangement has been described with reference to an "omnicell", i.e. a cell having a 360° main antenna and a 360° diversity antenna.

It is a preferred feature of the preset invention that the first and second antennas are adjacent antennas of a sectorized antenna. This feature has the advantage of making greater use of equipment inherent in a sectorized cell and avoiding the need for additional expensive antennas.

Antennas are generally sectorized in either three sectors of 120° or six sectors of 60° (see, for example, U.S. Pat. No. 4,128,740 of Graziano, assigned to Motorola Inc.)

Figure 3:
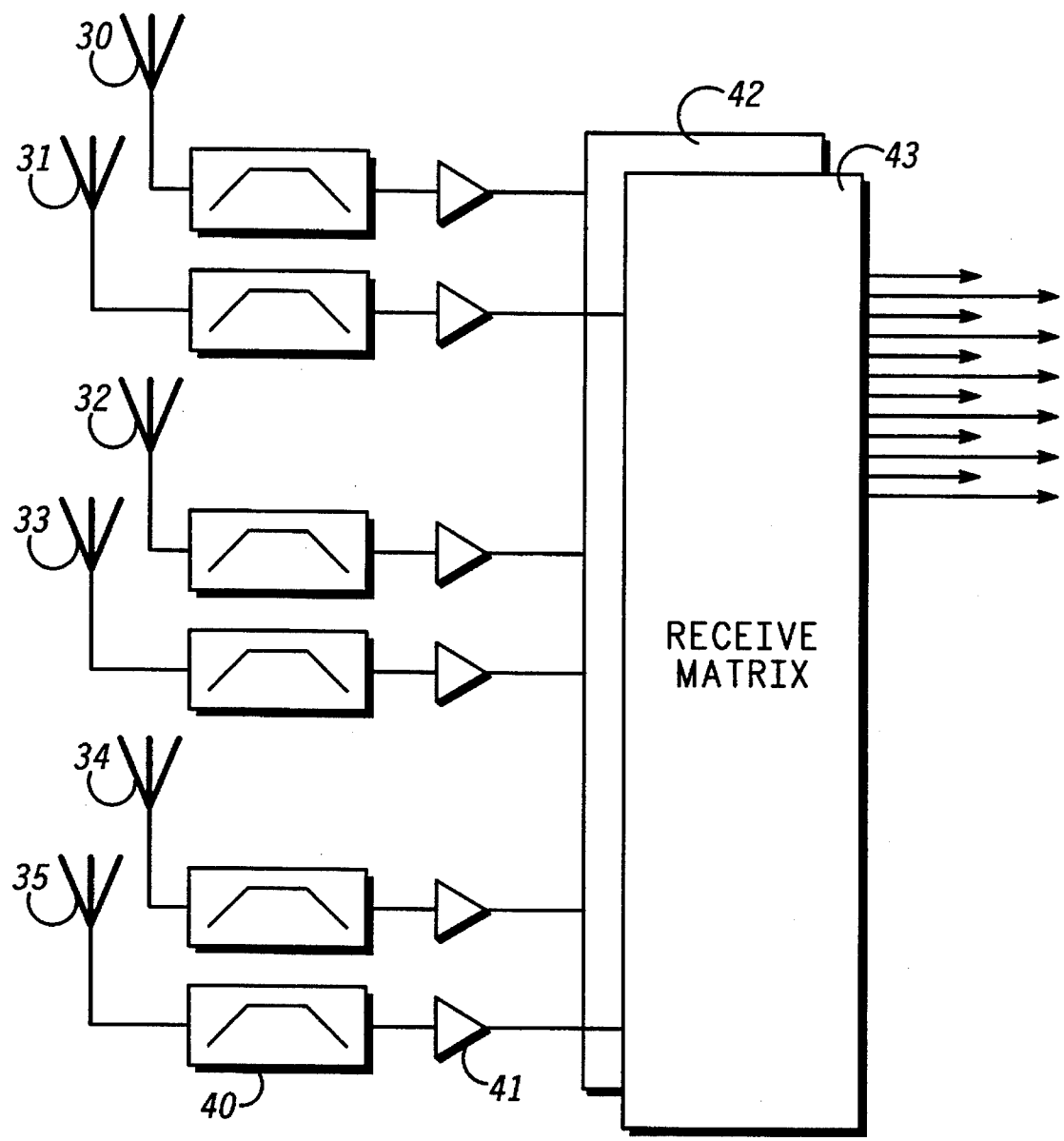
FIG. 3 is a block diagram of receive circuitry of a base station in accordance with second and third embodiment of the invention.

In the case of a three-sector antenna, it is generally necessary to provide three diversity antennas generally covering the same sectors as the three main antennas. This arrangement is illustrated in FIG. 3. In this figure, there is shown six antennas 30 to 35. In the case of 120° sectorized cells, antennas 30, 32 and 34 serve the three sectors of the cell and antennas 31, 33 and 35 are positioned above or below antennas 30, 32 and 34 to provide diversity in each of the sectors. The antennas are connected through pre-selectors 40 and pre-amplifiers 41 to receive matrixes 42 and 43. Matrix 42 is connected to the main antennas 30, 32 and 34 and matrix 43 is connected to the diversity antennas 31, 33 and 35. Each matrix is arranged to switch any one of its three antennas to any one of six output ports. Five of these output ports are connected to RCU as shown in FIG. 1 and the sixth output port is for test purposes only.

In the case of a 60° sectorized cell, the same arrangement as is illustrated in FIG. 3 can be used, but in this case each of the antennas 30 to 35 covers a different sector of the cell. In this arrangement, there are no diversity antennas. The operation will be described with reference to FIG. 4, which is an illustration of a 60° sectorized cell.

60° sectorized cells are normally only used in areas of high traffic, in which a single rack of five RCUs is insufficient to serve the cell, and normally two such racks are provided. Thus the cell can handle 80 calls simultaneously. One rack of RCUs serves, for example sectors 1, 2 and 3 of FIG. 4 and the other rack serves sectors 4, 5 and 6.

Figure 4:
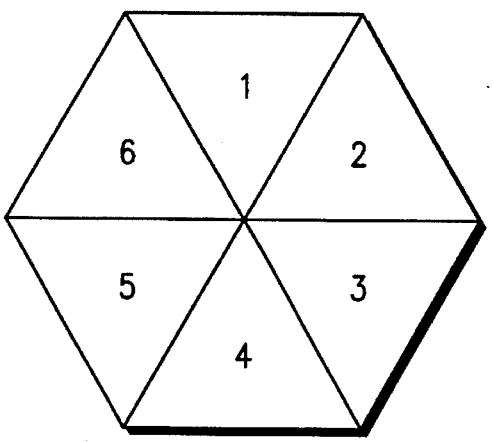
FIG. 4 is a diagram of a sectorized cell.

It is a feature of sectorized cells that the antennas do not give exactly 60° coverage, but generally give substantially more than 60° coverage. Thus, there is a large area of overlap between adjacent sectors. Where a mobile is operating at the edge of one sector, it may be susceptible to fading. At the same time the present invention recognizes that a mobile operating in this area may provide a reasonable signal to the adjacent sector and these signals can be diversity combined through separate RCUs. Thus, for example, where sector 2 of FIG. 4 is serving a mobile and the Rxlev or Rxqual indication of that mobile falls below a preset threshold, the processor 20 decides to apply diversity to that call and sets up a parallel channel through sector 1. The signals through sectors 1 and 2 are processed through parallel RCUs (assuming that a "spare" RCU is available) and a diversity decision is taken using the demodulated signals. If it emerges that the signal through sector 1 does not provide an improvement in this way, the controller 20 causes the "spare" RCU to switch to the antenna serving sector 3 on the next occurrence of a time slot on the channel in question.

A diversity signal will generally not provide improvement if it is less than 20 dB below the main signal. Thus, if either of the sectors adjacent sector 2, in which the mobile is located, provides a signal from that mobile within 20 dB of the main signal, diversity can be used to improve the main signal. No additional antennas or RCUs have had to be provided. Expressing this in terms of SNR, where a call on a channel in a sector is determined as having a SNR below a threshold, and where the same call is being received through a second antenna at a SNR within 20 dB of the first value, diversity can usefully be applied.

It has been explained that a rack of five RCUs generally serves three sectors of a 60° sectorized cell. Thus a rack of five RCUs will serve sectors 1, 2 and 3, with diversity being provided from sectors 6 and 4. Sector 5 is not connected and accordingly, the corresponding input to the matrix 42 or 43 is simply terminated. Likewise, the other rack of five RCUs Serving sectors 4, 5 and 6 has its input terminated corresponding to the antenna from sector 2.

We claim:

1. Radio communications apparatus for receiving a plurality of calls comprising:

a plurality of receivers tunable to a plurality of frequencies, first and second antennas, switching means for switching the plurality of receivers to selected ones of the first and second antennas and control means coupled to the plurality of receivers for tuning the receivers to receive calls, the control means comprising:

means for identifying a received call of low quality received through the first of the antennas and through a first of the plurality of receivers, means for identifying a spare receiver that is not required for receipt of a call, means for causing the switching means to switch the spare receiver to receive the call through the second antenna, means for tuning the spare receiver to the frequency of the call of low quality and means for diversity combining the calls through the first receiver and the spare receiver.

2. Apparatus according to claim 1 for receiving a plurality of calls separated over different time slots in a time-division multiple-access communications system wherein the control means are arranged to cause transmission of messages to remote units, to control those remote units for setting up of calls on selected time slots and wherein the control means are arranged to distribute the setting up of calls over the different time slots so that, during below-saturation operation, spare receivers are available on the same time slots as calls of low quality.

3. Apparatus according to claim 2 wherein the control means comprise means for terminating a call on a time slot, means for identifying that a corresponding receiver has consequently become spare and means for matching that spare receiver with another call of low quality on the same time slot.

4. Apparatus according to claim 3 wherein the means for matching comprises means for identifying a call of satisfactory quality on the same time slot as the call of low quality and means for transmitting a message to a corresponding remote unit to cause that call to be moved in time to the time slot on which the terminated call resided, thereby creating a spare receiver on the time slot of the call of low quality.

5. Apparatus according to claim 1 wherein the first and second antennas are directional antennas extending over the same sector of a sectorized antenna.

6. Apparatus according to claim 1 wherein the first and second antennas are adjacent directional antennas of a sectorized antenna.

7. Apparatus according to claim 1 wherein the means for identifying a call of low quality comprises means for determining that the call has a signal-to-noise ratio below a predetermined threshold.

8. Apparatus according to claim 1 wherein the means for identifying a call of low quality comprises means for determining that the call has a bit error rate below a predetermined threshold.

9. Apparatus according to claim 1 wherein the means for diversity combining the calls only combines the calls when they are determined as having signal-to-noise ratios within a predetermined range of each other.

10. A method of reception of a call comprising the steps of:

providing a plurality of receivers tunable to a plurality of frequencies;

providing first and second antennas;

providing switching means for switching the plurality of receivers to selected ones of the first and second antennas;

controlling the plurality of receivers for tuning the receivers to set up channels to receive calls;

identifying a received call of low quality received through the first of the antennas and through a first of the plurality of receivers;

identifying a spare receiver that is not required for receipt of a call;

causing the switching means to switch the spare receiver to receive the call through the second antenna;

tuning the spare receiver to the frequency of the call of low quality;

diversity combining the calls through the first receiver and the spare receiver.

* * * * *